May 26, 1953
K. W. GUEBERT
2,639,976
SEPARATION OF SULFUR DIOXIDE AND CHLORINE
WITH ANTIMONY TRICHLORIDE
Filed April 11, 1952
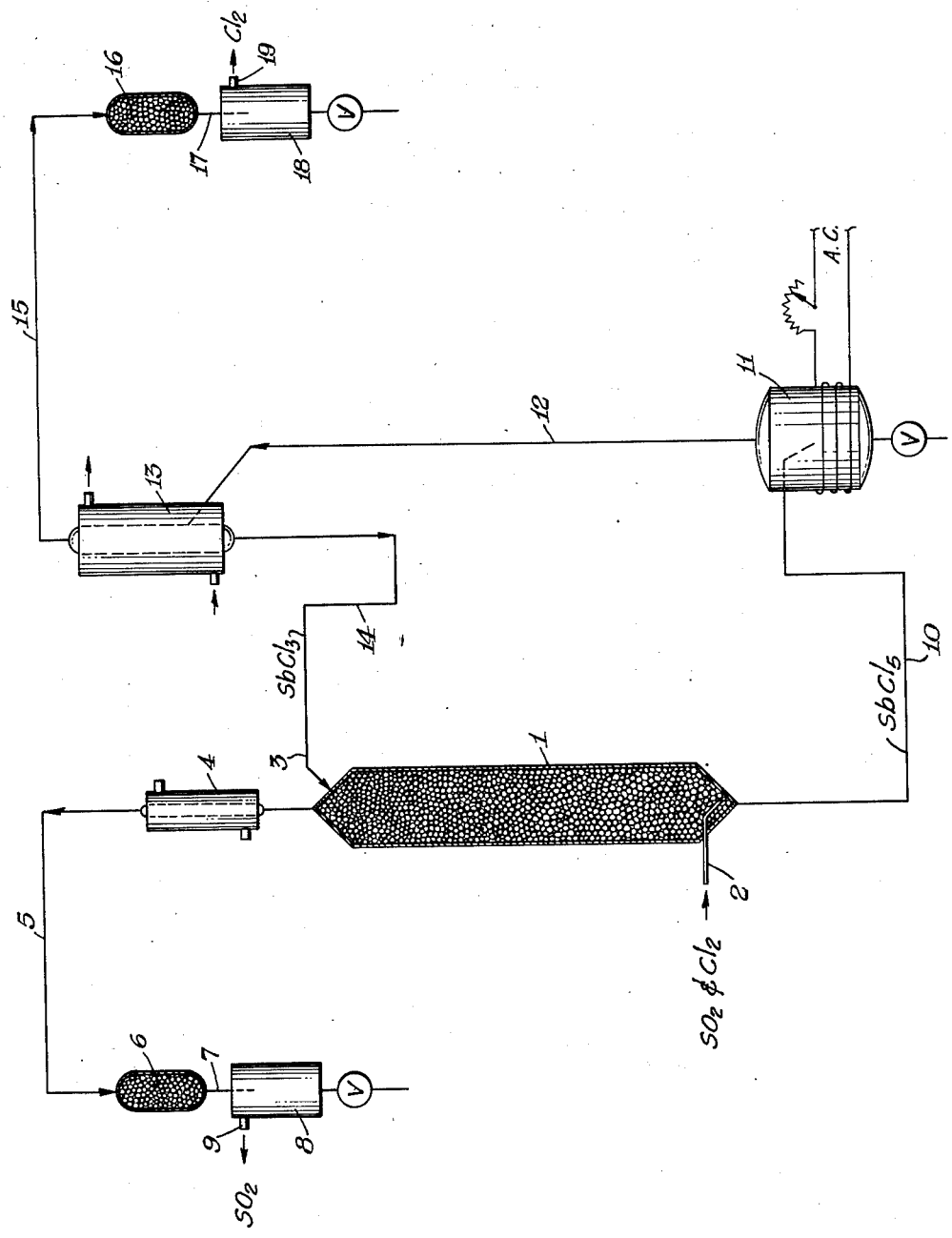
INVENTOR.
Kenneth E. Guebert
BY
Griswold & Burdick
ATTORNEYS Patented May 26, 1953

2,639,976

UNITED STATES PATENT OFFICE 2,639,976

SEPARATION OF SULFUR DIOXIDE AND CHLORINE WITH ANTIMONY TRICHLORIDE

Kenneth W. Guebert, Freeport, Tex., assignor to The Dow Chemical Company, Midland, Mich., a corporation of Delaware Application April 11, 1952, Serial No. 281,760

8 Claims. (Cl. 23—178)

This invention relates to a method of separating chlorine from a gaseous mixture containing sulfur dioxide and chlorine.

The difficulties of separating sulfur dioxide and chlorine have long been recognized. In an article published in Chemical Engineering Progress 44, 657–668 (1948), H. F. Johnstone states that the separation of sulfur dioxide and chlorine is the most difficult step in the production of chlorine by the thermal reaction of sulfur trioxide gas on solid sodium chloride. Johnstone even asserts that the separation of chlorine from sulfur dioxide arises as a critical barrier to the success of this and other processes which have otherwise been demonstrated as feasible. Many schemes have been suggested in the literature to effect the separation of sulfur dioxide and chlorine, such as fractional distillation, selective absorption, selective adsorption, and chemical separation. All of the procedures heretofore proposed suffer from one or more defects and most of them give very poor separation, if they work at all. The only technique which has given any indication of success is based on reacting sulfur dioxide with anhydrous aluminum chloride (U. S. Patent 2,553,767). This method is not very effective, however, where greater than equimolar ratios of chlorine to sulfur dioxide are encountered. Furthermore, strong chlorine cannot be prepared by this procedure when gases other than sulfur dioxide and chlorine are present.

A simple, rapid, and economical process has now been discovered for separating chlorine from a gaseous mixture consisting essentially of chlorine and sulfur dioxide by forming a loose chemical compound of chlorine and a metallic halide which can be readily decomposed at relatively low temperatures to liberate chlorine and regenerate the metallic halide. Since chlorine, rather than sulfur dioxide, is absorbed and concentrated, strong chlorine may be produced from dilute feed gases.

More specifically, the present invention is a method for separating chlorine from sulfur dioxide by reacting chlorine with antimony trichloride at temperatures below 140° C. to form antimony pentachloride according to the equation $$SbCl_3 + Cl_2 + SO_2 \longrightarrow SbCl_5 + SO_2 \uparrow$$

and recovering purified gas consisting essentially of sulfur dioxide. By increasing the temperature above 140° C., the antimony pentachloride decomposes into chlorine and antimony trichloride. After separating chlorine therefrom, the regenerated antimony trichloride may be returned to the first step of the process. The separation of chlorine and sulfur dioxide is usually carried out continuously by passing a stream of the mixed gases through a countercurrent stream of liquid antimony trichloride with the flow rates so regulated as to give maximum separation consistent with adequate input of the mixed gases.

The efficiency of separating chlorine from sulfur dioxide by absorption in liquid antimony trichloride is very good. Fairly pure sulfur dioxide and chlorine of greater than 95 weight per cent purity can be obtained in a single treatment by this process. A small amount of sulfur dioxide remains in the chlorine so separated, perhaps due to a slight solubility of sulfur dioxide in antimony pentachloride. It has been observed that the proportion of residual sulfur dioxide in the chlorine decreases when the temperature of absorption with liquid antimony trichloride is increased. The addition of a trace of HCl to the mixed gases prior to separation likewise appears to decrease the amount of sulfur dioxide in chlorine. When pure chlorine entirely free from sulfur dioxide is required, secondary purification may be desirable. For example, high purity chlorine may easily be produced by converting any remaining sulfur dioxide into sulfuryl chloride ($SO_2Cl_2$) and removing it. Sulfuryl chloride is readily formed by passing sulfur dioxide and chlorine over charcoal at temperatures below 70° C. The sulfuryl chloride is then separated by fractional distillation and may be subsequently decomposed into sulfur dioxide and chlorine by passage over charcoal at about 250° C.

The optimum conditions for separating chlorine and sulfur dioxide by contacting mixtures thereof with antimony trichloride, or with mixtures of antimony tri- and pentachlorides, are easily determined by trial. Although the process of the invention can be satisfactorily carried out at 25° C. employing solid antimony trichloride, it is usually preferable to use liquid antimony trichloride at somewhat higher temperatures. In the latter case, the minimum absorption temperature is the melting point of antimony trichloride, which is 73.4° C. Increasing the absorption temperature above the melting point of antimony trichloride improves the completeness of sulfur dioxide removal from chlorine. The maximum temperature which may be employed for absorption is about 140° C. at which temperature the decomposition of antimony pentachloride becomes appreciable. Temperature changes within the preferred limits of operation for the liquid phase antimony chloride absorption appear to have very little effect on the separation of chlorine and sulfur dioxide except as hereinbefore noted.

Absorption and separation of chlorine from sulfur dioxide does not appear to be affected by dilution of the gases with air. Likewise changes in the ratio of chlorine and sulfur dioxide do not critically affect the strength of chlorine produced. However, excessive flow rates increase chlorine losses to the sulfur dioxide stream and should be avoided for maximum efficiency of separation.

The process of the invention may be carried out in the apparatus illustrated schematically in the accompanying drawing. As there shown, the separation of chlorine and sulfur dioxide is carried out in an absorption column 1 filled with ceramic rings and provided with heating means not illustrated. A gas stream containing chlorine and sulfur dioxide is passed through into the bottom of the absorption column 1 and thence upward through a countercurrent stream of liquid antimony trichloride which enters the top of the absorption column 1 through a line 3. The liquid antimony trichloride as it flows downward through the absorption column 1 absorbs chlorine from the mixed gas stream and is converted to antimony pentachloride. The gas stream after being scrubbed with antimony trichloride to remove chlorine therefrom, passes from the top of the absorption column 1 into a reflux condenser 4 cooled with water to about 20° C. Here, entrained antimony chloride is condensed out of the gas stream for return to the absorption column 1. The residual gas, consisting essentially of sulfur dioxide, is passed through a line 5 to a charcoal converter 6 where any remaining chlorine is reacted with sulfur dioxide to form sulfuryl chloride. From the charcoal converter 6, the sulfur dioxide passes through a line 7 to a liquid sulfuryl chloride trap 8 and thereafter leaves as product through a line 9. Antimony chlorides, rich in antimony pentachloride, pass from the bottom of the absorption column 1, through a heated liquid seal leg 10, and into a still pot 11, the temperature of which is controlled by variable resistance winding. In the still pot 11, antimony pentachloride is decomposed and antimony trichloride and chlorine vapors are generated. These vapors from the still pot 11 pass through a vapor transfer line 12 maintained at about 220° C. and enter a condenser 13 maintained at 80° C. Here, antimony trichloride vapor is liquefied and returned to the top of the absorption column 1 by a line 3 after passing through a heated liquid seal leg 14.

The gaseous chlorine passes out of the top of condenser 13 through a line 15 to another charcoal converter 16 where residual sulfur dioxide is reacted with chlorine to form sulfuryl chloride. Chlorine from the charcoal converter 16 passes through a line 17 to a liquid trap 18 and thereafter is withdrawn as product through a line 19.

The process of the present invention can best be understood from the following example which serves to illustrate, but not limit, the invention.

The separation of chlorine and sulfur dioxide was carried out in experimental equipment similar to that illustrated in the drawing and referred to in the previous description. All equipment was constructed of Pyrex glass. The absorption column was one inch in inside diameter and was packed to a height of 20 inches with Pyrex glass helices whose inside diameter was $\frac{3}{32}$ of an inch. The column was jacketed so that heat could be applied to the column as desired. A two-liter electrically heated Pyrex flask was used as a still pot, the heat input to which was controlled by a variable resistance.

After filling the equipment with nitrogen and testing for leaks, it was placed in operation as hereinafter described. The vapor transfer line leaving the top of the still pot was heated with an electrical winding to about 220° C. The liquid antimony chloride transfer lines, including the liquid seal legs, to and from the top and bottom of the absorption column, were heated in hot air ovens thermostatically controlled at approximately 80° C. Water heated to 80° C. was circulated through the jacket of the condenser used to liquefy antimony trichloride present in the vapor stream from the still pot, while tap water at about 25° C. was used to cool the reflux condenser at the top of the absorption column. Heat was gradually applied to the still pot to start liquid antimony trichloride flowing through the absorption column. This flow was adjusted by controlling the heat input into the still until effective wetting of the packing in the absorption column was obtained. During operation, the liquid feed to the absorption column was a mixture of antimony trichloride with some antimony pentachloride formed by recombination of chlorine and antimony trichloride in the condenser. If desired, the antimony pentachloride could be eliminated by fractionation, but the extra equipment required was not considered justified in the laboratory apparatus.

For this experiment, the mixture of sulfur dioxide and chlorine to be separated was prepared by mixing the two pure gases. Chlorine and sulfur dioxide were stored in 100 lb. cylinders and withdrawn at manually controlled rates by means of needle valves. To remove traces of moisture, the sulfur dioxide was dried in a sulfuric acid scrubber. The flow rates were measured with glass capillary orifice meters using as manometer fluid, concentrated sulfuric acid saturated with sodium sulfate. The gases were then mixed and passed into the bottom of the absorption column to purge the system of nitrogen.

After the circulation of antimony trichlorides was satisfactorily adjusted and the desired flow rates of chlorine and sulfur dioxide were established, the absorption system was operated until equilibrium was obtained before any samples were taken. After the system had reached equilibrium, samples were taken of both the sulfur dioxide and chlorine product-gas streams and each was analyzed for sulfur dioxide and chlorine.

The accompanying table contains data from two runs in the above described experimental equipment operated as hereinbefore stated. In run A, the bottom of the absorption column was heated with an infra-red lamp. In run B, a trace of HCl was added throughout the run.

Table

| Run No. | Inlet Gas, Liters/hr. (By Orifice) | | $Cl_2$ Outlet Gas, Liters/hr., By Analysis | | | $SO_2$ Outlet Gas, Liters/hr., By Analysis | | |
|---|---|---|---|---|---|---|---|---|
| | $Cl_2$ | $SO_2$ | $Cl_2$ | $SO_2$ | Percent $Cl_2$ | $SO_2$ | $Cl_2$ | Percent $SO_2$ |
| A | 15 | 15 | 14.8 | 1.0 | 94 | 14.2 | 0.5 | 97 |
| B | 15 | 15 | 14.3 | 0.7 | 95 | 14.0 | 0.6 | 96 |

While the process of the invention has been described primarily as applicable to the separation of chlorine from sulfur dioxide, it is also effective in separating chlorine from sulfur dioxide in the presence of diluents, such as air, which are relatively inert under the conditions of separation. Since chlorine is absorbed and concentrated in the present process, diluents, when present in the mixed gases prior to separation, will be found in the sulfur dioxide following separation. It will be appreciated that the foregoing specification is to a large degree descriptive, rather than limitative, of the present invention, and that numerous variations are possible without departing from the spirit of the invention, as defined in the claims.

What is claimed is:

1. A method of separating chlorine from a substantially anhydrous gaseous mixture consisting essentially of chlorine and sulfur dioxide which comprises contacting the mixture with substantially anhydrous antimony trichloride at a temperature at which chlorine will react therewith, and recovering purified gas consisting essentially of sulfur dioxide.

2. A method of separating chlorine from a substantially anhydrous gaseous mixture consisting essentially of chlorine and sulfur dioxide which comprises contacting the mixture with substantially anhydrous antimony trichloride at a temperature at which chlorine will react therewith, separating purified gas consisting essentially of sulfur dioxide from the reaction product of chlorine and antimony trichloride, and heating the reaction product to evolve chlorine.

3. A method of separating chlorine from a substantially anhydrous gaseous mixture consisting essentially of chlorine and sulfur dioxide which comprises continuously passing a stream thereof into one end of a zone wherein it is contacted with substantially anhydrous antimony trichloride at a temperature at which chlorine will react therewith to form antimony pentachloride, and continuously withdrawing purified gas consisting essentially of sulfur dioxide from the other end of said zone.

4. A method of separating chlorine from a substantially anhydrous gaseous mixture consisting essentially of chlorine and sulfur dioxide which comprises continuously passing a stream thereof into one end of a zone wherein it is contacted with substantially anhydrous antimony trichloride at a temperature at which chlorine will react therewith to form antimony pentachloride, continuously removing purified gas consisting essentially of sulfur dioxide from the other end of said zone, thermally decomposing the antimony pentachloride to form chlorine and antimony trichloride, and reemploying the regenerated antimony trichloride in the process.

5. A method of separating chlorine and sulfur dioxide from a substantially anhydrous gaseous mixture thereof which comprises continuously contacting a stream of the gaseous mixture with substantially anhydrous antimony trichloride at a temperature below 140° C. to form antimony pentachloride, continuously removing sulfur dioxide substantially free from chlorine, decomposing the antimony pentachloride above 140° C. to form chlorine and antimony trichloride, and reemploying the regenerated antimony trichloride in the first step of the process.

6. A method according to claim 5 wherein the antimony trichloride is liquid.

7. A method according to claim 5 wherein the antimony trichloride is solid.

8. A method of separating chlorine from a substantially anhydrous gaseous mixture thereof which comprises continuously passing a stream of the gaseous mixture into one end of a reaction zone wherein it is passed countercurrently through a liquid stream of antimony chlorides initially rich in antimony trichloride at a temperature below 140° C. to react chlorine with antimony trichloride to form antimony pentachloride, continuously withdrawing from opposite ends of said zone a stream of sulfur dioxide substantially free from chlorine and a stream of antimony chlorides rich in antimony pentachloride, heating the antimony chlorides after withdrawal into a separate zone at a temperature above 140° C. to decompose the antimony pentachloride to form chlorine and antimony trichloride, and returning the regenerated antimony trichloride to the initial step of the process.

KENNETH W. GUEBERT.

References Cited in the file of this patent

UNITED STATES PATENTS

| Number | Name | Date |
|---|---|---|
| 1,781,830 | Barstow | Nov. 18, 1930 |
| 2,401,644 | Iler | June 4, 1946 |

OTHER REFERENCES

J. W. Mellor's "Inorganic and Theoretical Chem.," vol. 9, pages 474 and 486; vol. 10, page 221. Longmans, Green and Company, New York.